(12) United States Patent
Beard et al.

(10) Patent No.: US 9,300,692 B2
(45) Date of Patent: Mar. 29, 2016

(54) SYSTEM AND METHOD FOR IMPLEMENTING DATA MIGRATION WHILE PRESERVING SECURITY POLICIES OF A SOURCE FILER

(71) Applicant: NetApp, Inc., Sunnyvale, CA (US)

(72) Inventors: Derek Beard, Austin, TX (US); Duen-Wen Hsiao, Austin, TX (US)

(73) Assignee: NetApp, Inc., Sunnyvale, CA (US)

( * ) Notice: Subject to any disclaimer, the term of this patent is extended or adjusted under 35 U.S.C. 154(b) by 52 days.

(21) Appl. No.: 14/011,723

(22) Filed: Aug. 27, 2013

(65) Prior Publication Data

US 2015/0067759 A1  Mar. 5, 2015

(51) Int. Cl.
*H04L 29/06* (2006.01)
*G06F 17/30* (2006.01)

(52) U.S. Cl.
CPC .......... *H04L 63/20* (2013.01); *G06F 17/30079* (2013.01)

(58) Field of Classification Search
None
See application file for complete search history.

(56) References Cited

U.S. PATENT DOCUMENTS

| | | |
|---|---|---|
| 5,432,912 A | 7/1995 | Kihara |
| 5,592,611 A | 1/1997 | Midgely et al. |
| 5,710,885 A | 1/1998 | Bondi |
| 5,893,140 A | 4/1999 | Vahalia et al. |
| 5,937,406 A | 8/1999 | Balabine |
| 6,324,581 B1 * | 11/2001 | Xu .................... G06F 17/30171 707/999.01 |
| 6,401,093 B1 | 6/2002 | Anand et al. |
| 6,658,540 B1 | 12/2003 | Sicola et al. |
| 6,938,039 B1 | 8/2005 | Bober |
| 7,035,907 B1 | 4/2006 | Decasper et al. |
| 7,069,278 B2 | 6/2006 | Telkowski |
| 7,149,858 B1 * | 12/2006 | Kiselev ............... G06F 11/2076 711/162 |
| 7,203,731 B1 | 4/2007 | Coates |
| 7,444,335 B1 | 10/2008 | Colrain et al. |
| 7,571,168 B2 | 8/2009 | Bahar |
| 7,574,443 B2 | 8/2009 | Bahar |
| 7,603,372 B1 * | 10/2009 | Honicky, Jr. ........ G06F 11/3414 |
| 7,653,699 B1 | 1/2010 | Colgrove et al. |
| 7,698,306 B2 | 4/2010 | Watanabe et al. |
| 7,769,723 B2 | 8/2010 | Zheng et al. |
| 7,844,584 B1 | 11/2010 | Griess |
| 7,925,629 B2 | 4/2011 | Webman et al. |
| 7,953,819 B2 | 5/2011 | Liang |
| 8,117,244 B2 | 2/2012 | Marinov et al. |
| 8,281,360 B2 | 10/2012 | Flewallen |
| 8,285,817 B1 * | 10/2012 | Balasubramanian G06F 17/30079 709/219 |
| 8,346,966 B1 | 1/2013 | Phatak |
| 8,452,856 B1 | 5/2013 | Lent et al. |

(Continued)

FOREIGN PATENT DOCUMENTS

WO   WO-2013/022582 A2   2/2013

OTHER PUBLICATIONS

International Search Report and Written Opinion, mailed Dec. 11, 2014, for related application PCT/US2014/053011, filed Aug. 27, 2014. 10pages.

(Continued)

*Primary Examiner* — Michael R Vaughan
*Assistant Examiner* — Richard McCoy
(74) *Attorney, Agent, or Firm* — Mahamedi Paradice LLP

(57) ABSTRACT

A data migration system in which security policies of a source file system are preserved, in an environment in which clients actively issue communications for the source filer while data is migrated to a destination file system.

20 Claims, 10 Drawing Sheets

(56) References Cited

U.S. PATENT DOCUMENTS

| | | | |
|---|---|---|---|
| 8,484,164 B1 | 7/2013 | Sivakumar et al. | |
| 8,655,848 B1* | 2/2014 | Leverett | G06F 17/30088 707/660 |
| 8,676,980 B2 | 3/2014 | Kreeger | |
| 2002/0032751 A1* | 3/2002 | Bharadwaj | H04L 29/06 709/218 |
| 2002/0059451 A1 | 5/2002 | Haviv | |
| 2002/0078174 A1 | 6/2002 | Sim | |
| 2002/0124079 A1 | 9/2002 | Pulsipher | |
| 2002/0133491 A1 | 9/2002 | Sim et al. | |
| 2002/0143984 A1 | 10/2002 | Hudson et al. | |
| 2002/0156613 A1 | 10/2002 | Geng | |
| 2002/0174194 A1* | 11/2002 | Mooney | H04L 12/58 709/219 |
| 2003/0009480 A1* | 1/2003 | Lin | G06F 17/30115 |
| 2003/0028514 A1 | 2/2003 | Lord et al. | |
| 2003/0078946 A1 | 4/2003 | Costello et al. | |
| 2003/0097454 A1 | 5/2003 | Yamakawa et al. | |
| 2003/0158862 A1 | 8/2003 | Eshel | |
| 2003/0177107 A1* | 9/2003 | Brown | G06F 17/3007 |
| 2003/0182313 A1 | 9/2003 | Federwisch et al. | |
| 2004/0049702 A1 | 3/2004 | Subramaniam et al. | |
| 2004/0054850 A1 | 3/2004 | Fisk | |
| 2004/0078467 A1 | 4/2004 | Grosner et al. | |
| 2004/0123154 A1* | 6/2004 | Lippman | G06F 21/50 726/11 |
| 2004/0250113 A1 | 12/2004 | Beck | |
| 2005/0010838 A1 | 1/2005 | Davies et al. | |
| 2005/0075856 A1 | 4/2005 | Wozniak et al. | |
| 2005/0125503 A1* | 6/2005 | Iyengar | H04L 63/08 709/213 |
| 2005/0193245 A1 | 9/2005 | Hayden et al. | |
| 2006/0004765 A1 | 1/2006 | Anderson et al. | |
| 2006/0015507 A1 | 1/2006 | Butterworth et al. | |
| 2006/0015584 A1 | 1/2006 | Ocko | |
| 2006/0064474 A1* | 3/2006 | Feinleib | G06F 8/63 709/220 |
| 2006/0179037 A1 | 8/2006 | Turner | |
| 2006/0206603 A1 | 9/2006 | Rajan | |
| 2006/0212481 A1 | 9/2006 | Stacey et al. | |
| 2007/0022087 A1 | 1/2007 | Bahar | |
| 2007/0022121 A1 | 1/2007 | Bahar | |
| 2007/0022129 A1 | 1/2007 | Bahar | |
| 2007/0038697 A1 | 2/2007 | Zimran et al. | |
| 2007/0055703 A1* | 3/2007 | Zimran | G06F 17/30123 |
| 2007/0083570 A1 | 4/2007 | Fineberg | |
| 2007/0088702 A1* | 4/2007 | Fridella | G06F 17/30123 |
| 2007/0094354 A1 | 4/2007 | Soltis | |
| 2007/0156989 A1 | 7/2007 | Man et al. | |
| 2007/0168046 A1* | 7/2007 | Misawa | G06F 3/14 700/1 |
| 2008/0010411 A1 | 1/2008 | Yang et al. | |
| 2008/0040385 A1 | 2/2008 | Barrall et al. | |
| 2008/0281908 A1 | 11/2008 | McCanne et al. | |
| 2008/0294748 A1* | 11/2008 | Brown | H04L 67/2823 709/219 |
| 2009/0043823 A1 | 2/2009 | Iftode et al. | |
| 2009/0067440 A1 | 3/2009 | Chadda et al. | |
| 2009/0150593 A1 | 6/2009 | Hamilton et al. | |
| 2009/0182835 A1 | 7/2009 | Aviles et al. | |
| 2009/0182836 A1 | 7/2009 | Aviles et al. | |
| 2009/0182945 A1 | 7/2009 | Aviles | |
| 2009/0222509 A1 | 9/2009 | King et al. | |
| 2009/0240784 A1 | 9/2009 | Soltis | |
| 2009/0271412 A1 | 10/2009 | Lacapra et al. | |
| 2009/0300739 A1 | 12/2009 | Nice et al. | |
| 2010/0023674 A1 | 1/2010 | Aviles | |
| 2010/0082774 A1 | 4/2010 | Pitts | |
| 2010/0083675 A1 | 4/2010 | Merritt | |
| 2010/0121945 A1 | 5/2010 | Gerber et al. | |
| 2010/0217869 A1 | 8/2010 | Esteban et al. | |
| 2010/0312861 A1 | 12/2010 | Kolhi et al. | |
| 2010/0332401 A1 | 12/2010 | Prahlad et al. | |
| 2011/0016085 A1 | 1/2011 | Kuo | |
| 2011/0022812 A1 | 1/2011 | van der Linden et al. | |
| 2011/0066668 A1 | 3/2011 | Guarraci | |
| 2011/0184907 A1 | 7/2011 | Schrock et al. | |
| 2011/0196842 A1 | 8/2011 | Timashev et al. | |
| 2011/0320436 A1 | 12/2011 | Hokanson | |
| 2012/0005193 A1 | 1/2012 | Nemoto | |
| 2012/0011176 A1 | 1/2012 | Aizman | |
| 2012/0016838 A1 | 1/2012 | Arai et al. | |
| 2012/0041829 A1* | 2/2012 | Rothschild | G06Q 30/06 705/26.1 |
| 2012/0059864 A1 | 3/2012 | Bandyopadhyay | |
| 2012/0117328 A1 | 5/2012 | McKean et al. | |
| 2012/0150799 A1 | 6/2012 | Matsuzawa | |
| 2012/0324110 A1 | 12/2012 | Kohli | |
| 2013/0019301 A1 | 1/2013 | Reddy et al. | |
| 2013/0054530 A1* | 2/2013 | Baker | G06F 17/30079 707/639 |
| 2013/0097680 A1 | 4/2013 | Bendapudi et al. | |
| 2013/0132544 A1 | 5/2013 | Krishnan et al. | |
| 2013/0155902 A1 | 6/2013 | Feng | |
| 2013/0227048 A1 | 8/2013 | Xie et al. | |
| 2013/0322298 A1 | 12/2013 | Alexander, Jr. et al. | |
| 2013/0325804 A1 | 12/2013 | Bachar et al. | |
| 2013/0339547 A1 | 12/2013 | Nath et al. | |
| 2014/0052812 A1 | 2/2014 | Ozawa | |
| 2014/0129667 A1 | 5/2014 | Ozawa | |
| 2014/0165176 A1* | 6/2014 | Ow | H04L 63/10 726/8 |
| 2014/0298454 A1* | 10/2014 | Heng | G06F 21/55 726/22 |
| 2015/0020059 A1* | 1/2015 | Davis | G06F 9/4862 717/171 |
| 2015/0207872 A1 | 7/2015 | Stiemerling et al. | |

OTHER PUBLICATIONS

B. Pawlowski, C. Juszczak, P. Staubach, C. Smith, D. Lebel, and D. Hitz, NFS version 3: Design and implementation. In Proceedings of the Summer 1994 USENIX Technical Conference, 15 pages, pp. 137-151, 1994. Retrieved from the Internet http://people.cs.pitt.edu/~manas/courses/2510/nfs3.pdf.

D. Bossen, J. Tendler, K. Reick, "Power4 System Design for High Reliability," IEEE MICRO Magazine, vol. 22 No. 2, pp. 16-24, Mar.-Apr. 2002.

Office Action mailed May 12, 2015, for related U.S. Appl. No. 14/011,699, filed Aug. 27, 2013, 27 pages.

Office Action mailed Aug. 28, 2015, for related U.S. Appl. No. 14/011,699, filed Aug. 27, 2013, 26 pages.

Office Action mailed Jun. 18, 2015, for related U.S. Appl. No. 14/011,696, filed Aug. 27, 2013, 25 pages.

Office Action mailed Jun. 18, 2015, for related U.S. Appl. No. 14/011,719, filed Aug. 27, 2013, 18 pages.

Office Action mailed Jun. 16, 2015, for related U.S. Appl. No. 14/011,718, filed Aug. 27, 2013, 27 pages.

Microsoft Press. 2002. Microsoft Computer Dictionary, Fifth Edition (5th ed.). p. 348, Microsoft Press, Redmond, WA, USA.

Office Action mailed Aug. 19, 2015, for related U.S. Appl. No. 14/031,023, filed Sep. 18, 2013, 32 pages.

Office Action mailed Apr. 9, 2015, for related U.S. Appl. No. 14/031,023, filed Sep. 18, 2013, 29 pages.

Office Action mailed Apr. 24, 2015, for related U.S. Appl. No. 14/031,026, filed Sep. 18, 2013, 30 pages.

Office Action mailed Aug. 20, 2015, for related U.S. Appl. No. 14/031,026, filed Sep. 18, 2013, 27 pages.

Office Action mailed Dec. 17, 2015, for related U.S. Appl. No. 14/031,019, filed Sep. 18, 2013, 31 pages.

Notice of Allowance mailed Dec. 10, 2015, for related U.S. Appl. No. 14/011,718, filed Aug. 27, 2013, 13 pages.

Non-Final Office Action mailed Nov. 20, 2015 for U.S. Appl. No. 14/031,018, filed Sep. 18, 2013, 28 pages.

Notice of Allowance mailed Nov. 6, 2015 for U.S. Appl. No. 14/011,723, filed Aug. 27, 2013, 11 pages.

Veeraraghavan K, et al., "DoublePlay: Parallelizing Sequential Logging and Replay," Journal ACM Transactions Computer Systems (TOGS), Special Issue APLOS 2011 TOGS Homepage archive, vol. 30 (1), Feb. 2012, pp. 3:1-3:24.

(56) References Cited

OTHER PUBLICATIONS

You I., "On Asynchronous Enforcement of Security Policies in "Nomadic" Storage Facilities," Published in: Industrial Electronics (ISIE), 2013 IEEE International Symposium on, May 28-31, 2013, pp. 1-6.

Notice of Allowance mailed Dec. 3, 2015, for related U.S. Appl. No. 14/011,696, filed Aug. 27, 2013, 15 pages.

Notice of Allowance mailed Dec. 15, 2015, for related U.S. Appl. No. 14/011,719, filed Aug. 27, 2013, 14 pages.

Li et al., "Managing Data Retention Policies at Scale", Published in: Network and Service Management, IEEE Transactions on (vol. 9, Issue: 4); pp. 393-406; Oct. 19, 2012; Browse Journals & Magazines Network & Service Man.

Reed et al., "Security considerations when designing a distributed file system using object storage devices", Published in: Security in Storage Workshop, 2002. Proceedings. First International IEEE; Date of Conference: Dec. 11, 2002; pp. 24-34.

\* cited by examiner

SYSTEM AND METHOD FOR IMPLEMENTING DATA MIGRATION WHILE PRESERVING SECURITY POLICIES OF A SOURCE FILER

TECHNICAL FIELD

Examples described herein relate to a system and method for implementing data migration while preserving IP-based security policies of a source filer.

BACKGROUND

Network-based file systems include distributed file systems which use network protocols to regulate access to data. Network File System (NFS) protocol is one example of a protocol for regulating access to data stored with a network-based file system. The specification for the NFS protocol has had numerous iterations, with recent versions NFS version 3 (1995) (See e.g., RFC 1813) and version 4 (2000) (See e.g., RFC 3010). In general terms, the NFS protocol allows a user on a client terminal to access files over a network in a manner similar to how local files are accessed. The NFS protocol uses the Open Network Computing Remote Procedure Call (ONC RPC) to implement various file access operations over a network.

Other examples of remote file access protocols for use with network-based file systems include the Server Message Block (SMB), Apple Filing Protocol (AFP), and NetWare Core Protocol (NCP). Generally, such protocols support synchronous message-based communications amongst programmatic components.

DETAILED DESCRIPTION

Figure 1:
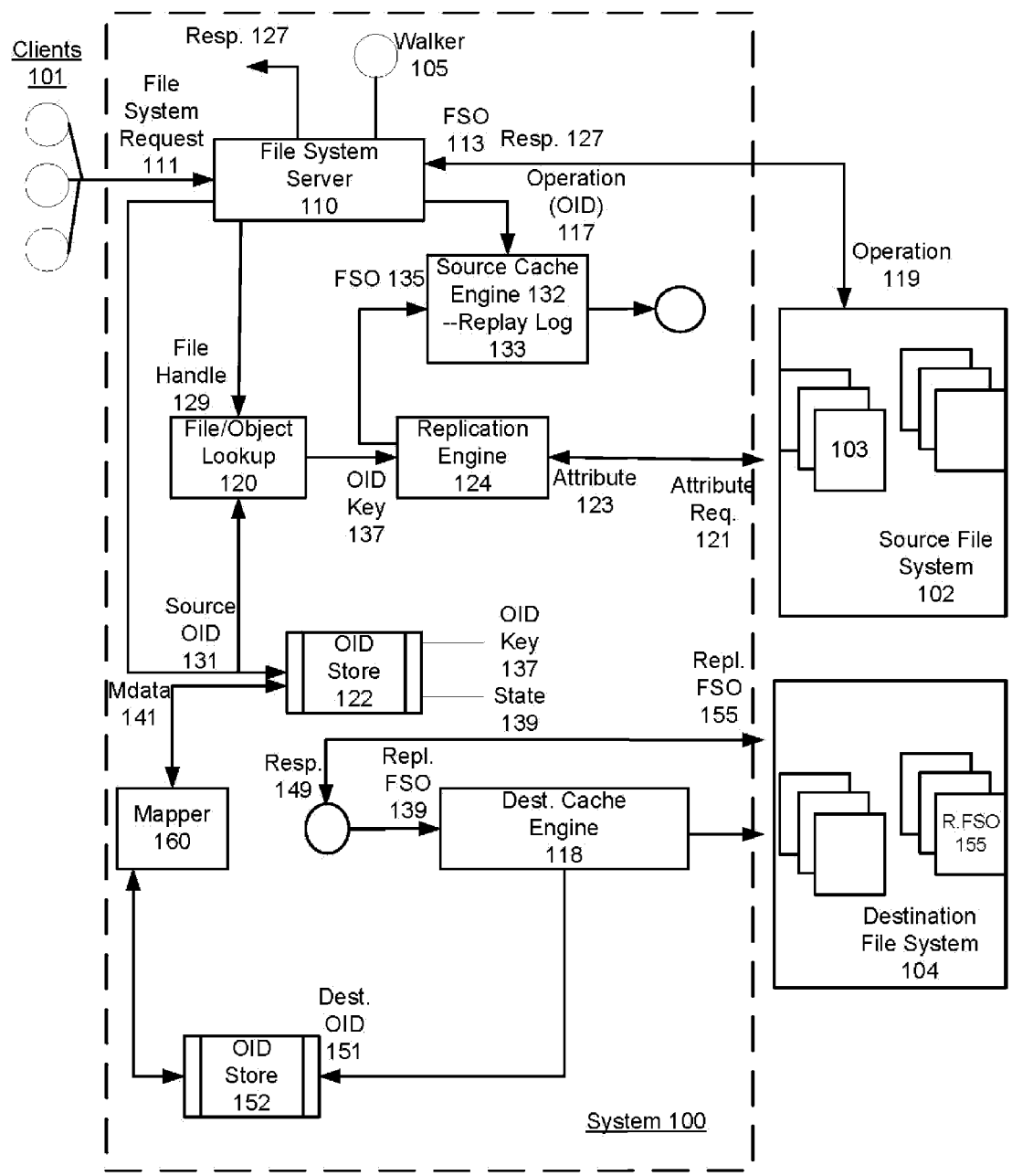
FIG. 1 illustrates a data migration system that is operable to migrate data from a network file system, according to one or more embodiments.

A data migration system in which security policies of a source file system are preserved, in an environment in which clients actively issue communications for the source filer while data is migrated to a destination file system.

Still further, some examples described herein provide a system for migrating data from a source file system to a destination file system while the source file system is in active use, in part by transitioning the client's use of the source file system to that of the destination file system without unmounting the client from the source file system. In order to maintain the continuity of service to the clients during the data migration, some embodiments provide for intercepting communications between clients and source/destination file systems, and further provide for manipulating attributes of responses from the destination file system before forwarding those responses to the corresponding clients.

According to some embodiments, requests made from individual clients are forwarded from the source file system to the destination file system, and responses are received from the destination file system for the requesting clients. In one or more of the responses, one or more attributes of a file system object provided at the destination file system and specified in the response are manipulated to match an attribute for a corresponding file system object in the source file system. Each of the responses is forwarded to a requesting one of the plurality of clients. The forwarded responses include those responses in which the one or more attributes are manipulated.

In another example, a data migration system is provided that includes a server, positioned in-line as between a plurality of clients and a source file system that is being migrated to a destination file system. In some variations, the data migration system can also be positioned between the plurality of clients and the destination file system. In a first duration in which clients in the plurality of clients request use of the source file system, individual file system objects that are part of the source file system are replicated with the destination file system, and requests from individual clients are received and forwarded to the source file system. The destination file system is signaled to perform a set of file system operations that are specified in the requests from the individual clients and which affect the source file system. Additionally, the server receives and forward responses from the source file system to the individual clients who made the requests that specified the set of file system operations. In a second duration in which the plurality of clients request use of the source file system, requests are forwarded from individual clients to the destination file system, and responses are received from the destination file system. For one or more of the responses, one or more attributes of a file system object provided at the destination file system and specified in the response are manipulated to match an attribute for a corresponding file system object in the source file system. Each of the responses are forwarded to the requesting clients.

Still further, some described herein include a system for migrating data from a source file system to a destination file system, in a manner that is transparent and seamless to clients of the source file system.

In an embodiment, a data migration system includes a server positioned in-line as between a plurality of clients and the source file system. The server transparently inserts in-line to receive and forward communications as between the source file system and individual clients of the source file system. While clients in the plurality of clients request use of the source file system, the server implements processes to replicate each file system object that is part of the source file system with the destination file system. In response to a client request that alters the source file system, the server can operate to (i) forward a response from the source file system to the requesting client, and (ii) queue a file system operation specified by the corresponding request, for performance at the destination file system after the response from the source file system has been forwarded to the one of the plurality of clients.

In another embodiment, file system objects that comprise a source file system can be replicated on a destination file system while the source file system handles file system operations from a plurality of clients that are mounted to the source file system. When the source file system and the destination file system are deemed to not be equivalent, a server asynchronously implements, on the destination file system, those file system operations that affect the source file system. Once the source file system and the destination file system are deemed equivalent, file system operations that affect the source file system are implemented synchronously on the destination file system. Each of the plurality of clients can then transition from utilizing the source file system to using the destination file system.

Still further, in some embodiments, a data migration system that operates to migrate data from a source file system to a destination file system. Among the operations performed, the data migration system identifies a collection of file system objects that are associated with a source file system in active use by a plurality of clients. Individual file system operations that are intended to be handled by the source file system are intercepted at a location that is in-line and external to the source file system. The data migration system replicates each file system object of the collection at a destination file system. When individual file system operations are determined to alter the source file system, the data migration system asynchronously implements the one or more of the individual file system operations on the destination file system.

Still further, in some embodiments, a data migration system can implement a series of file system operations in order to traverse a source file system and identify file system objects that comprise the source file system. A data structure is maintained in which each identified file system object is associated with an entry and a current set of attributes for that file system object. Each identified file system object is created and maintained on a destination file system. Individual file system operations that are generated from clients for the source file system are intercepted at a node that is in-line and external to the source file system. A corresponding file system object specified by each of the file system operations is identified. A determination is made from the data structure as to whether the corresponding file system object has previously been identified. If the corresponding file system object has not previously been identified, then (i) determining a set of attributes for the corresponding file system object, (ii) adding an entry for the corresponding file system object and its set of attributes on the data structure, and (iii) replicating the corresponding data object at the destination file system.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

System Overview

FIG. 1 illustrates a data migration system that is operable to migrate data from a network file system, without interrupting the ability of client terminals ("clients") to use the network file system, according to one or more embodiments. As shown by an example of a data migration system 100 operates to migrate data from a source file system ("source filer") 102 to a destination file system ("destination filer") 104. Each of the source and destination filers 102, 104 can correspond to a network-based file system. A network-based file system such as described by various examples herein can correspond to a distributed file system that is provided in a networked environment, under a protocol such as NFS Version 3 or Version 4. Each of the source and destination filers 102, 104 can include logical components (e.g., controller) that structure distributed memory resources in accordance with a file system structure (e.g., directory-based hierarchy), as well process requests for file system objects maintained as part of that file system.

In an example of FIG. 1, data is migrated from the source filer 102 while the clients 101 are mounted to and actively using the source filer. More specifically, the data migration system 100 initiates and performs migration of data from the source filer 102 while clients 101 are mounted to the source filer. Among other benefits, the data migration system 100 can migrate the data from source filer 102 to the destination filer 104 in a manner that is transparent to the clients, without requiring the clients to first unmount and cease use of the source filer. By way of example, an administrator of a network environment may seek to migrate data from the source filer 102 to the destination filer 104 as a system upgrade for an enterprise network, without causing any significant interruption to the services and operation of the enterprise network.

According to some embodiments, the data migration system 100 is implemented through use of one or more in-line appliances and/or software. The data migration system 100 can be deployed on a computer network in position to intercept client requests 111 directed to source filer 102. The data migration system 100 can include processes that provide a data file server 110, as well as cache/memory resources (e.g., high-speed media) that enable queuing of operations and objects and caching of file system objects. In an example of FIG. 1, a transparent data migration system is deployed between the source filer 102 and the clients 101 while the clients actively use the source filer, without any network or reconfiguration of the endpoints. Among other benefits, the data migration system 100 operates independently, is self-contained, and installs in the network path between the clients and file servers.

With further reference to FIG. 1, the data migration system 100 can be implemented by, for example computer hardware (e.g., network appliance, server etc.) that is positioned in-line with respect to a source filer that is to be migrated. In particular, the data migration system 100 can be positioned physically in line to intercept traffic between the clients and the source filer 102. Moreover, the data migration system 100 can provide a transparent virtualization of the source filer 102, so that the client terminals continue to issue requests for use of the source filer 102 for purpose of intercepting and proxying client/source filer exchanges. In implementation, the data migration system 100 can be operated to replicate the source filer to the destination filer 104 without requiring clients that are utilizing the source filer 102 to have to remount or otherwise interrupt use of the source filer.

In an embodiment, the transparency in the in-line insertion of the data migration system 100 is accomplished by configuring the data migration system to intercept and use traffic that is directed to the Internet Protocol (IP) address of the source filer 102. For example, an administrator of the network environment 10 can configure the data migration system 100 to utilize the IP addresses of the source filer 102, and further to forward traffic directed to the source filer after the traffic has been intercepted and processed. Moreover, return traffic directed from the source filer 102 to the clients 101 can be configured, through manipulation of the filer response to appear as though the traffic is being communicated directly from the source filer. In this way, the data migration system 100 performs various replication processes to migrate the source filer 102 without disrupting the individual client's use of the source filer 102. As a result, the data migration system 100 is able to migrate data from the source filer 102, without interruption or performance loss to the clients 101.

In more detail, some embodiments provide for the data migration system 100 to include a data file server 110, a file/object lookup component 120, a replication engine 124 and a cache engine 132. The data migration system 100 can implement processes that initially populate the destination filer 104 asynchronously, while the clients actively use the source filer 102. Moreover, file system operations communicated from the clients 101 can be implemented asynchronously at the destination filer 104. The asynchronous nature of the replication and file system updates facilitates the ability of the data migration system 100 to eliminate or reduce latency and performance loss in respect to the client's use of the source filers. At some point when the source and destination filers 102, 104 are deemed equivalent, operations that affect file system objects of the source filer 102 can be replayed on the destination filer 104 in synchronized fashion. This allows for a subsequent stage, in which the destination filer 104 can be used in place of the source filer 102, in a manner that is transparent to the clients who have not yet unmounted from the source filer 102.

In an example of FIG. 1, the file system server 110 fields file system requests 111 from clients 101 while the replication engine 124 implements replication processes that populate and update the destination filer 104. In one implementation, the file system server 110 receives and processes NFS (version 3) packets issued from clients 101. Other file system protocols can also be accommodated. The file system server 110 can include logical components that summarize the protocol-specific request (e.g., NFS request) before processing the request in a protocol-agnostic manner. The file system server 110 can also include logic that implement transactional guarantees for each NFS request. This logic can determine which NFS (or other protocol) requests are to be serialized, and which requests can be performed in parallel (e.g., read-type requests). The file system server 110 identifies file system objects for replication through either active or passive discovery. In active discovery, a system process (e.g., "walker 105") traverses the source filer 102 to determine the file system objects 103. In passive discovery, requests communicated from the clients 101 that utilize the source filer 102 are inspected in order to identify file system objects that need to be migrated or updated on the destination filer 104.

As the file system server 110 handles requests from clients 101, source cache engine 132 can cache file system objects and metadata of file system objects. The source cache engine 132 can implement a variety of algorithms to determine which file system objects to cache. For example, the source cache engine 132 can cache file system objects on discovery, and subsequently identify those file system objects that are more frequently requested. In some implementations, the metadata for the file system objects can be cached in a separate cache. Examples of metadata that can be cached include file handle, file size, c-time (create time) and m-time (modification time) attributes associated with individual file system objects (e.g., directories, folders, files).

In an example shown by FIG. 1, the source cache engine 132 includes a replay logic 133. The replay logic 133 can be implemented as a component that replays operations for creating, modifying or deleting file system objects the destination filer 104. As described below, the replay logic 133 can be implemented in one or more instances in connection with operations performed to update or replicate on the source filer 102.

The replication engine 124 operates to implement file system operations that replicate file system objects of the source filer 102 and their existing states (as provided by the metadata) on the destination filer 104. As described below, the replication engine 124 can replicate file system objects using file system requests made on the source and destination filers 102, 104. As such, the replication engine 124 can be implemented as part of or in addition to the source cache engine 132. Moreover, the operations implemented through the replication engine 124 can be performed asynchronously. Accordingly, the replication engine 124 can utilize or integrate replay logic 133.

The client requests 111 to the file system server 110 may request file system objects using a corresponding file system handle. In some embodiments, the identification of each file system object 113 in client requests 111 can be subjected to an additional identification process. More specifically, client requests 111 can identify file system objects 113 by file handles. However, the source filer 102 may export multiple volumes when the clients 101 are mounted, and some clients 101 may operate off of different export volumes. In such instances, a file system object can be identified by different file handles depending on the export volume, and different clients may have mounted to the source filer using different export volumes, so that multiple file handles can identify the same file system object. In order to resolve this ambiguity, data management system 100 utilizes an additional layer of identification in order to identify file system objects. In some embodiments, file system objects are correlated to object identifiers (OID) that are based in part on attributes of the requested object. An OID store 122 record OID nodes 131 for file handles (as described below), and further maintain tables which map file handles to OID nodes 131.

In an example of FIG. 1, the file/object lookup 120 uses the OID store 122 to map the file handle 129 of a requested file system object to an object identifier (OID) node 131. Each OID node 131 can include an OID key 137 for a corresponding file system object, as well as state information 139 for that file system object. The state information 139 can correspond to metadata that is recorded in the OID store 122 for the particular object.

In one implementation, the OID key 137 for each file system object can be based on attributes for the file system object. For example, the OID key 137 can be determined from a concatenation of an identifier provided with the source filer 102, a volume identifier provided with the source filer, and other attributes of the object (e.g., a node number as determined from an attribute of the file system object). Accordingly, the properties that comprise the OID key 137 can be based at least in part on the file system object's attributes. Thus, if the file system server 110 has not previously identified a particular file system object, it will implement operations to acquire the necessary attributes in order to determine the OID key 137 for that file system object.

Once an OID node 131 is created, the file/object lookup 120 adds the OID node to the OID store 122. The OID store 122 can correspond to a table or other data structure that links the file handles of objects for given exports (or volumes) of the source filer 102 to OID keys 137, so that each OID key identifies a corresponding file system object.

File System Object Discovery

In one implementation, a system client ("walker 105") or process can be used to traverse the source filer 102 independently of other requests made by clients 101 in order to actively discover objects of the source filer 102. The walker 105 can issue file system operations that result in a traversal of the source filer 102, including operations that laterally and vertically traverse a hierarchy of file system objects maintained with the source filer 102.

In addition to fielding requests from the walker 105, file system server 110 can also process request 111 from the various clients that actively use the source filer 102. When a request is received that specifies a file system object 113, file system server 110 uses the file handle 129 of the requested file system object to check whether an object identifier (OID) exists for the specified file handle. The request for a given file system object 113 can originate from any of the clients 101 that utilize the source filer 102, including the walker 105. In one embodiment, the file system server 110 communicates the file handle 129 to the file/object lookup 120. The file/object lookup 120 references the file handle 129 to determine if a corresponding OID node 131 exists. If an OID node 131 exists for the file handle 129, then the assumption is made that the corresponding file system objects 113 in the source filer 102 has previously been processed for data migration to the destination filer 104.

If the file/object lookup 120 does not identify an OID node 131 for the file handle 129, then the attributes of the newly encountered object is acquired. One of the components of the data management system 100, such as the file system server 110 or replication engine 124, can issue a request 121 from the source filer 102 to obtain the attributes 123 of the newly discovered object. The request may be issued in advance of the file system server 110 forwarding the request to the source filer 102 for a response.

Replication Engine

In an embodiment, the file system server 110 processes individual file system requests 111, and determines the file handle 129 for each file system object. The OID store 122 can be maintained to store OID nodes 131 (for discovered objects) as tuples with corresponding file handles 129. When the file/object lookup 120 determines that no OID node 131 exists in the OID store 122 for a given file handle 129, then the replication engine 124 is triggered to replicate the corresponding file system object to the destination filer 104. Additionally, as mentioned, an OID node is determined and added to the OID store 122. The entry into the OID store 122 can specify the OID node 131 of the new file system object, as well as state information as determined from the attributes of the corresponding file system object. In this way, the OID node 131 for the discovered file system object can be stored in association with the file handle 129 for the same object.

In one implementation, the replication engine 124 acquires the attributes 123 of the newly discovered file system object by issuing a file system attribute request 121 to the source filer 102. For example, in the NFS version 3 environment, the replication engine 124 can issue a "GetAttr" request to the source filer 102. In variations, other components or functionality can obtain the attributes for an unknown file system object.

Still further, in some variations, the source cache engine 132 can procure and cache the attributes of the source filer 102. When the attributes are acquired for a given OID node 131 (e.g., replication engine 124 issues GetAttr request), the request can made to the source cache engine 132, rather than to the source filer 102. This offloads some of the load required from the source filer 102 during the migration process.

The replication engine 124 can implement processes to replicate a file system object with the destination filer 104. As mentioned, the replication engine 124 can operate either asynchronously or synchronously. When operating asynchronously, replication engine 124 schedules operations (e.g., via replay logic 133) to create a newly discovered file system object with the destination filer 104. The asynchronous implementation can avoid latency and performance loss that might otherwise occur as a result of the data migration system 100 populating the destination filer 104 while processing client request for file system objects.

According to some embodiments, the replication engine 124 can replicate the corresponding file system object by performing a read operation on the source filer 102 for the newly discovered file system object, then triggering a create operation to the destination filer 104 (or the destination caching engine 118) in order to create the discovered file system object on the destination filer. Examples recognize, however, that the source filer 102 may inherently operate to process requests based on file handles, rather than alternative identifiers such as OIDs. Accordingly, in requesting the read operation from the source filer 102, the replication engine 124 specifies a file handle that locates the same file system object with the source filer. Furthermore, the file handle used by the issuing client may be export-specific, and each export may have a corresponding security policy. For the source filer 102 to correctly recognize the read operation from the replication engine 124, the replication engine 124 can be configured to utilize the file handle that is specific to the client that issued the original request. By using the file handle of requesting client, the security model in place for the client can be mirrored when the read/write operations are performed by the replication engine 124. In one implementation, the OID store 122 may include a reverse lookup that matches the OID key 137 of the newly identified file system object to the file handle to which the request for the file system object was made. In this way, components such as the replication engine 124 can issue requests from the source and destination filers 102, 104, using the appropriate file handles.

In one implementation, the replication engine 124 can communicate the file system object 135 that is to be created at the destination filer to the replay logic 133. In turn, the replay logic 133 schedules and then performs the operation by communicating the operation to the destination filer 104. Thus, from the newly discovered file system object 135, the replay logic 133 can replicate the file system object 155 at the destination filer 104. The replay logic 133 can, for example, issue a create operation 139 to replicate the file system object 135 at the destination filer 104. The replicated file system object 155 can be associated with the same file handle as the corresponding file system object 135 maintained at the source filer 102.

In response to the create operation 139, the destination filer 104 returns a response that includes information for determining the OID for the replicated file system object 155 at the destination. For example, the replication engine 124 can use the response 149 to create a destination OID node 151 for the replicated file system object 155. The destination OID node 151 can also be associated with the file handle of the corresponding object in the source filer 102, which can be determined by the replication engine 124 for the requesting client (and the requesting client-specific export of the source filer). As such, the destination OID node 151 of the replicated file system object 155 is different than that of the source OID node 131.

The destination OID store 152 can maintain the destination node OID 151 for each newly created file system object of the destination filer 104. The mapper 160 can operate to map the OID node 131 of source file system objects to the OID node 151 for the replicated object at the destination filer 104. Additionally, when the data migration has matured and the destination filer 104 is used to respond to clients that are mounted to the source filer 102, (i) the OID store 122 can map the file handle specified in the client request to an OID node 131 of the source filer 102, and (ii) the mapper 160 can map the OID node 131 of the source filer 102 to the OID node 151 of the destination filer 104. Among other uses, the mapping enables subsequent events to the file system object of the source filer 102 to be carried over and mirrored on the replicated file system object of the destination filer 104. Furthermore, based on the mapping between the OID nodes 131, 151, the determination can be made as to whether the requested file system object has been replicated at the destination filer 104.

Additionally, when the migration has progressed to the point that the destination filer 104 provides the responses to the client requests 111, the mapper 160 can translate the attributes of a file system object retrieved from the destination filer 104, so that the object appears to have the attributes of the corresponding object in the source filer 102. By masquerading attributes, the mapper 160 ensures responses from the destination filer 104 appear to originate from the source filer 102. This allows the clients to seamlessly be transitioned to the destination filer 104 without interruption.

In one variation, replication engine 124 triggers creation of the previously un-migrated file system object 135 in a cache resource that is linked to the destination filer 104. With reference to an example of FIG. 1, replication engine 124 triggers replication of file system object 135 to a destination cache engine 118, which carries a copy of the file system object in the destination filer 104.

File System Updates

In addition to replicating newly discovered file system objects, data management system 100 updates file system objects that have been replicated on the destination filer 104 with file system operations that are specified from clients 101 and directed to the source file system 102. The file system server 110 may signal the destination filer 104 the file system operations that alter objects of the source filer 102. Examples of such file system operations include those which are of type write, create, or delete. Read type operations, on the other hand, do not affect the objects of the source filer 102. When the request 111 from the clients 101 specify alteration operations (e.g., write, create, delete), the file system server 110 (i) determines the OID for the specified file system object(s), (ii) communicates the operation 117 with the OID to the source cache engine 132 (which as described below uses replay logic 133 to schedule performance of the operation at the destination filer 104), and (iii) forwards the operation to the source filer 102 (with the file system handle). The source filer 102 returns a response 127 to the file system server 110. The response 127 is communicated to the requesting client 101 in real-time, to maintain the transparent performance date of migration system 100. Accordingly, when the file system operation 119 is of a read type, it is forwarded to the source filer 102, and the corresponding response 127 is forwarded to clients 101.

The replay logic 133 operates to intelligently queue file system operations that alter the source filer for reply at the destination filer 104. By way of example, replay logic 133 can implement hierarchical rule-based logic in sequencing when file system operations are performed relative to other file system operations. For example, file system operations that designate the creation of a directory may be performed in advance of file system operations which write to that directory. As another example, the replay logic 133 can determine when two operations on the same file system object cancel one another out. For example, an operation to create a file system object can be canceled by an operation to delete the same object. If both operations are queued, the replay logic 133 may detect and eliminate the operations, rather than perform the operations. Still further, during the asynchronous destination population stage, the replay logic 133 can detect when a given operation affects a portion of the source filer 102 that has yet to be replicated. In such instances, the replay logic 133 can ignore the operation, pending replication of the portion of the source filer 102 that is affected by the file system operation.

The replay logic 133 can include logic that replays the queued file system operations 117 in an appropriate sequence, through the destination cache engine 118. For example, the destination cache engine 118 can maintain file system objects of the destination filer 104. The replay logic 133 may implement the operations 117 on the destination cache engine 118 in order to preserve performance from the destination filer 104 as it replicates the source filer 102. As a variation, the replay logic 133 can directly replay the file system operations at the destination filer 104. When the data management system operates in synchronous or bypass (see FIG. 2C) mode, the destination cache engine 118 further preserve system performance and transparency.

Additionally, the responses 127 to client requests 111 from the source filer 102 can be inspected by the file system server 110 for metadata 141, including timing attributes for file system objects. The metadata can be stored in the OID store 122 as part of each file object's OID node. Additionally, when requests are issued on the destination filer 104, the responses from the destination filer can be inspected by the replication engine 124, and attributes detected from the response can be stored with the corresponding destination OID node 151 in the destination OID store 152.

The mapper 160 can be used to link the OID nodes of the respective source and destination OID stores 122, 152, for purposes that include identifying destination objects specified in client requests to the source filer 102. Additionally, the mapper 160 can implement logic to compare attributes of corresponding OID nodes in order to determine whether, for example, the replicated object is up to date as compared the source object.

Staged Migration

According to embodiments, data migration system 100 implements the migration of the source filer 102 in accordance with stages that affect the respective states of the source and destinations. FIG. 2A through FIG. 2E illustrate sequence diagrams that illustrate the stages of the data migration system 100.

Figure 2A:
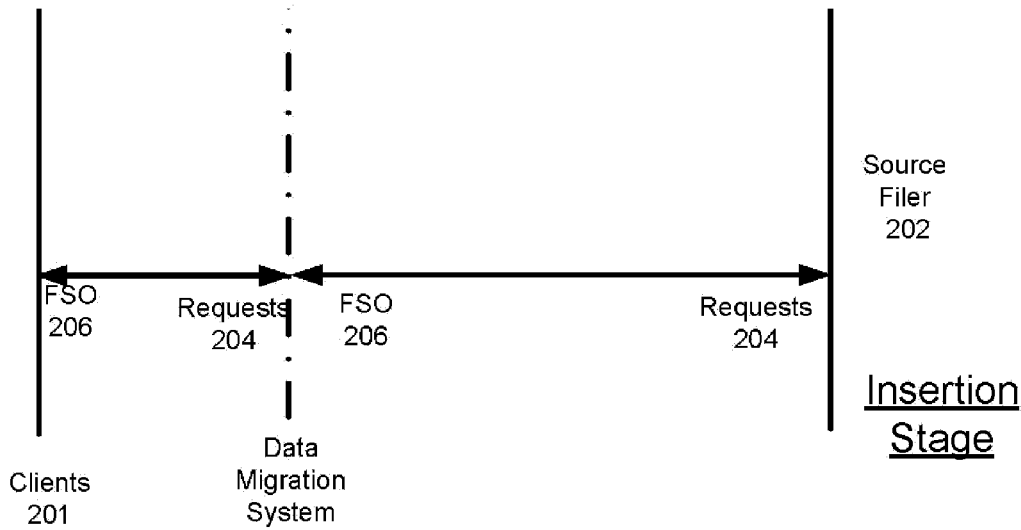
FIG. 2A through FIG. 2E illustrate sequence diagrams that illustrate the stages of the data migration system 100.

FIG. 2A illustrates an insertion stage for the data migration system 203. In the insertion phase, the data management system 203 is inserted in-line and transparently to intercept traffic as between a set of clients 201 and the source filer 202. The data management system can be configured to detect and process traffic bound for the IP address of the source filer 202. The IP addresses of the source filer 102 can be obtained programmatically or through input from an administrator in order to intercept incoming traffic without requiring clients to re-mount to the source filer 202.

By way of example, in an NFS environment, clients are programmed to reconnect to a mounted filer when a connection to the filer is terminated. The data migration system 203 can be inserted by terminating a client's existing connection with the source filer 202, then intercepting traffic to the source filer once the client attempts to re-set the network connection. The data migration system 203 then connects to the clients 201 and uses the IP address of the source filer in order to appear as the source filer. Once connected, the data migration system 203 acts as a proxy between the client and source filer. Clients 201 can issue requests 204 (e.g., NFS operations) for the source filer 202, which are intercepted and forwarded onto the source filer by the data migration system. The responses 206 can be received from the source filer 202 and then communicated to the requesting clients 201.

Figure 2B:
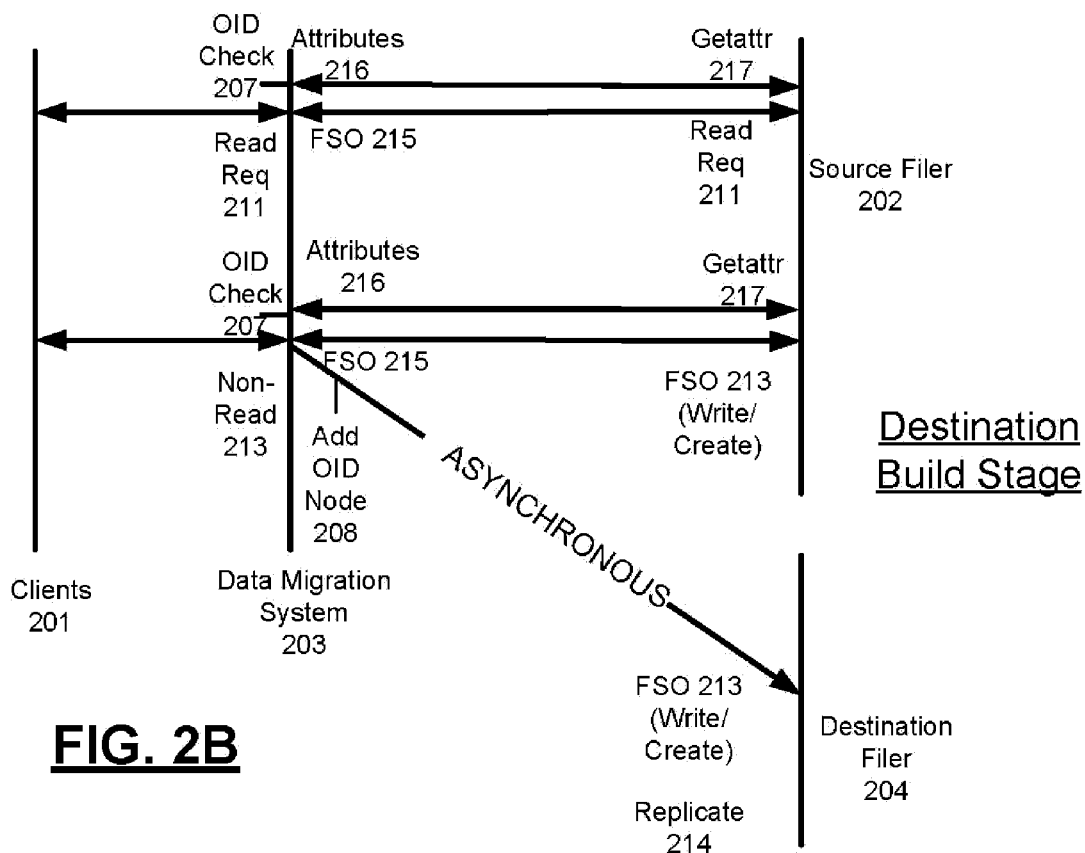

FIG. 2B illustrates a build stage during which the destination filer 104 is populated to include the file system objects of the source filer 102. In the build stage, clients 201 issue requests 211 (read type requests) and 213 (non-read type requests) specifying file system operations from the source filer 202. The source filer 202 uses the requests 211, 213 (which can include active discovery requests, such as issued from the walker 105) to determine the file system objects 215 that need to be created on the destination filer 204. In response to receiving requests 211, the data migration system 203 performs an OID check 207 to determine if the specified file system object 215 has previously been encountered (and thus migrated).

As noted in FIG. 1, the OID check 207 can be implemented by the file/object lookup 120 which compares the file handle in the request with an OID store 122. If the specified file system object is known, then the file system object is not re-created at the destination filer 204. If the specified file system object is not known, then the data migration system 203 acquires the attributes 216 from the source filer 202 (e.g., "Getattr" request 217) and then creates 208 an OID node for the newly discovered object. With the OID node added, the object is replicated 214 at the destination filer 204. The replication of the object is performed asynchronously, using hardware such as cache resources which can queue and schedule the creation of the file system object with the destination filer 204.

While an example of FIG. 2B depicts the attribute request being made of the source filer 202, in some implementations, a caching resource (e.g., source cache engine 132) can cache the attributes of some or all of the file system objects on the source filer 202. As such, the attribute request 217 can be implemented as an internal request in which the data migration system 203 uses its internal cache resources to determine the attributes of a newly discovered file system object.

In addition to replication, file system requests 213 (e.g., write, create, or delete-type requests) which alter the source file system 202 are also scheduled for replay 219 on corresponding file system objects in the destination filer 204. The data migration system 203 may implement, for example, replay logic 133 to intelligently schedule and replay file system operations at the destination filer 204 that affect the contents of the source filer 202. Those operations which do not affect the contents of the source filer (e.g., read type operations 211) are forwarded to the source filer 202 without replay on the destination filer 204.

Figure 2C:
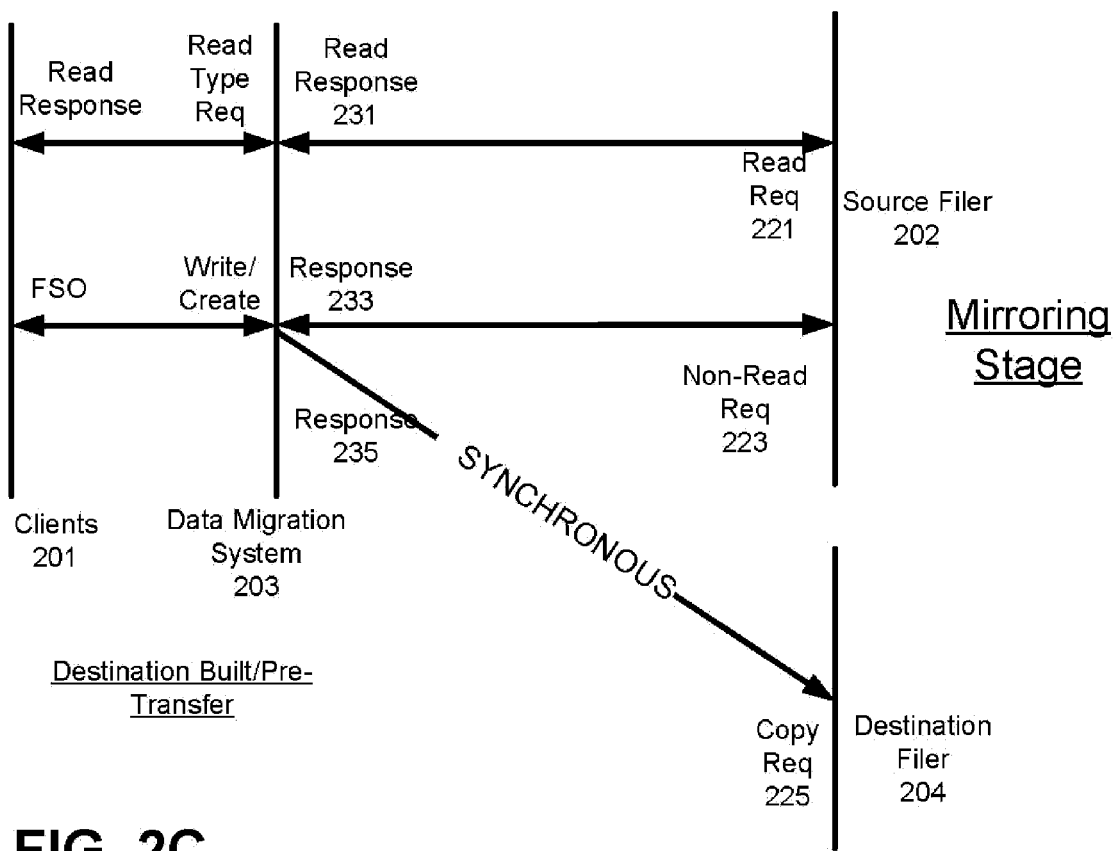

FIG. 2C illustrates a mirroring stage during which the destination filer is synchronously updated to mirror the source file system 202. The mirroring stage may follow the destination build stage (FIG. 2B), after when the source filer 202 and the destination filer 204 are deemed substantially equivalent. In one implementation, the mirroring state may be initiated by, for example, an administrator, upon a programmatic and/or manual determination that the source and destination filers are substantially equivalent. In this stage, when the clients 201 issue requests that alter the source filer 202, the data migration system 203 generates a corresponding and equivalent request to the destination filer 204. The request to the destination filer 204 can be generated in response to the incoming request, without the source filer 202 having first provided a response. Read-type requests 221 can be received by the data migration system 203 and forwarded to the source filer 202 without any mirroring operation on the destination filer 204. The response 231 to the read operation 221 are forwarded to clients 201. Other types of client-requested operations 223, which can affect the contents of the source filer 202 (e.g., write, delete, create) are copied 225 and forwarded to the destination filer 204. When the requests 223 are received, a copy of the request 225 is generated and communicated synchronously to the destination filer 104. The copy request 225 is signaled independently and in advance of the source filer 202 providing a response 233 to the request 223. A response 235 from the destination filer 204 can also be received for the copy request 225. As a result, both the source filer 202 and destination filer 204 provide a corresponding response 233, 235.

The data migration system 203 can forward the response 233 from the source filer 202 to the requesting client 201. However, if the response 233, 235 from the source and destination filers are inconsistent, failure safeguards can be implemented. For example, the destination file system 204 may be directed to re-replicate the file system object of the source filer 202. As an alternative or variation, the data management system 203 may revert to asynchronously updating the destination filer 204 until the inconsistency between the source and destination filers is deemed resolved.

Figure 2D:
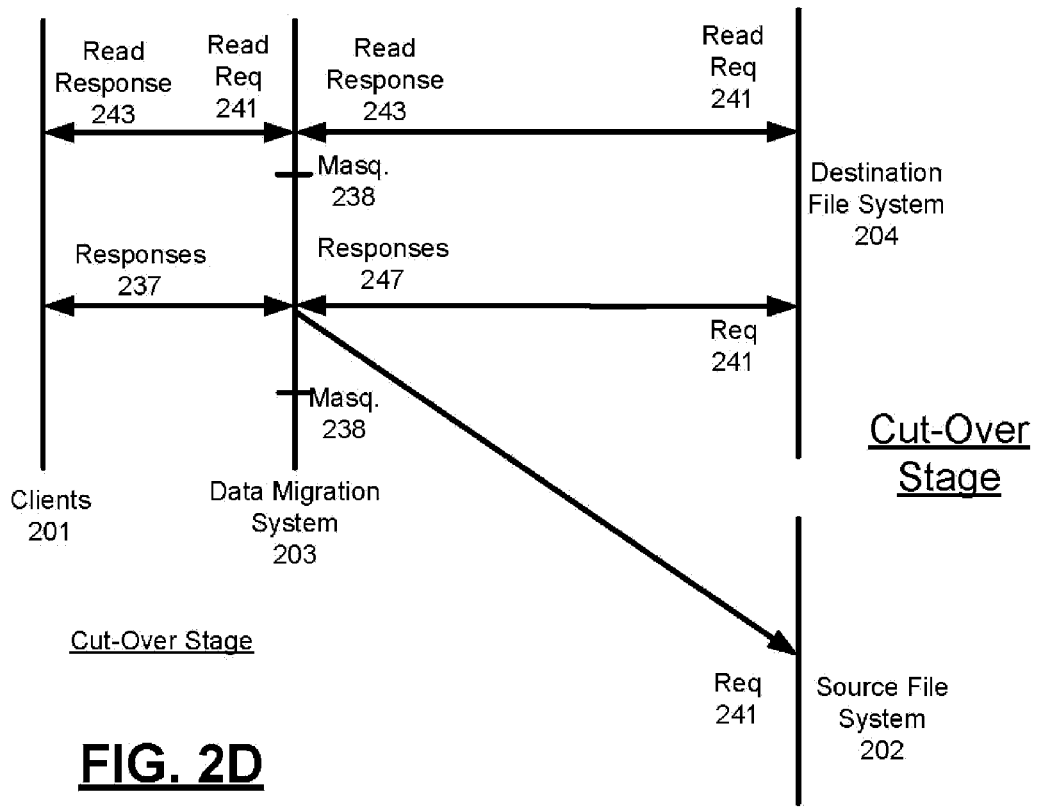

FIG. 2D illustrates a cut-over stage, when the destination filer 204 is used to handle client requests while the clients remain mounted to the source filer 202. As with the mirroring stage, the determination to enter the cut-over stage can be made programmatically and/or manually. In the cut-over stage, the clients 201 still operate to communicate with the source filer 202. However, the data migration system 203 operates to transparently forward the requests to the destination filer 204 for response, and also forwards the response from the destination filer to the clients 201. Thus, the data migration system 203 forwards the requests 241 to the destination filer 204, and not to the source filer 202. Responses 243 to the requests 241 are forwarded from the destination filer 204 to the clients 201.

In the cut-over stage, clients 201 operate under the perception that they are communicating with the source filer 202. In order to maintain the operability of the clients, the data management system 203 operates to provide a programmatic appearance that the source filer 202 is in fact providing the response to the client requests. To maintain this appearance to the clients, the data management system 203 can masquerade the responses 233, 237 to appear as though the responses originate from the source filer 202, rather than the destination filer 204.

In some embodiments, the data migration system 203 implements masquerade operations 238 on responses that are being forwarded from the destination filer 204 to the clients 201. In some implementations such as provided by NFS environments, the clients 201 require responses 243, 247 to include attributes that map to the source filer 202, rather than the destination filer 204. Certain metadata, such as time metadata, alters as a result of the replication and/or use of the corresponding object with the destination filer 204. While the metadata on the destination filer 204 is updated, in order for the clients 201 to process the responses 243, 247, the metadata needs to reflect the metadata as provided on the source filer 202 (which the client understands). The data migration system 203 performs masquerade operations 238 which translate the metadata of the responses 243, 247 to reflect the metadata that would be provided for relevant file system objects as carried by the source filer 202. By way of example, m-time of a file system object changes if the data of the corresponding file system object changes. The fact that the file system object is returned from the destination filer 204 will mean that the file system object will have a different m-time than the source file system 202 if the file system object is not modified after it is migrated to the destination filer. In order to maintain the attributes of the responses 243, 247 consistent for clients 201, the data migration system 203 manipulates a set of attributes in providing the response to the client (e.g., masquerades the attributes). Specifically, the attributes specified in the response to the clients are re-written to match the attributes as would otherwise be provided from the source filer. Thus, for example, the data migration system 203 manipulates, in the response provided back to the client, the attribute received from the destination filer corresponding to the m-time so that it matches the m-time as would otherwise be provided from the source filer 202. Other attributes that can be manipulated in this manner include, for example, file identifier and file system identifier. With reference to FIG. 1, the file system server 110 stores the attributes of file system objects as they are replicated and updated. For example, the file system server 110 can store current attributes by inspecting replies from the source filer 202, and storing the attributes of file system objects in their respective OID node 131.

In addition to manipulating attributes in the response (e.g., masquerading), data migration system 203 operates to confirm that when new objects are created on the destination filer 204, the file identifiers generated for the object are unique in the namespace of the source filer 202. In order to accomplish this, one embodiment provides that the data migration system 203 creates a file object (e.g., dummy) in the source filer 202. The source filer 202 then creates file identifier for the new object, and the data migration system 203 is able to use the identifier as created by the source filer to ensure the newly created object of the destination filer 204 is unique in the namespace of the source filer 202.

Figure 2E:
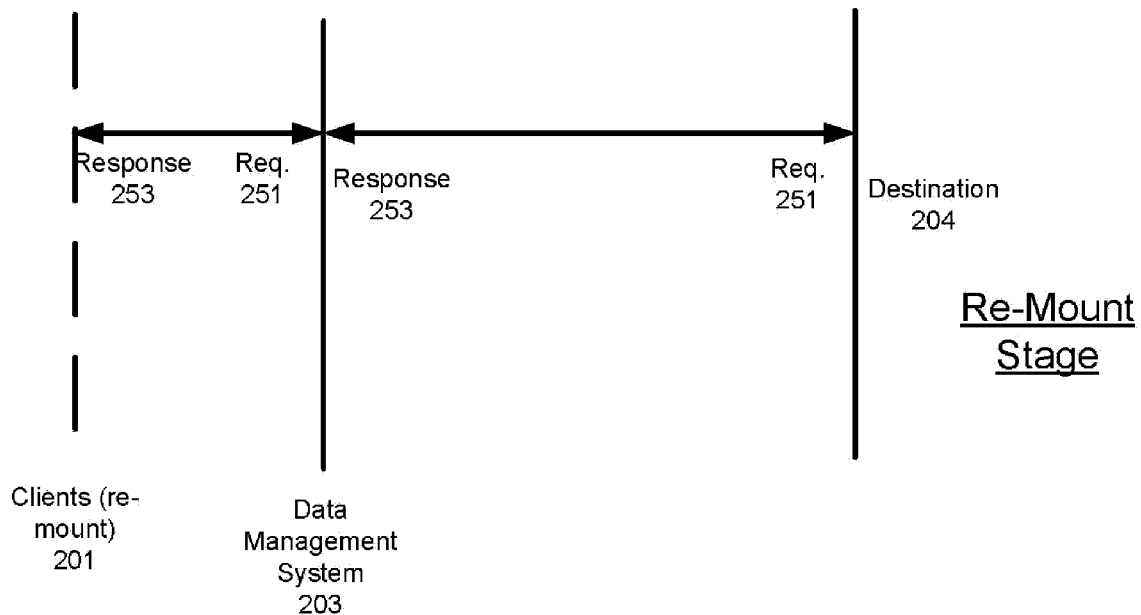

FIG. 2E illustrates re-mount state, when the clients re-mount to the destination filer. According to some embodiments, clients 201 can be re-mount at the destination filer 204 at the convenience of the administrator. Moreover, the administrator can remount the clients to the destination filer 204 in rolling fashion (e.g., one at a time) in order to ensure that any mishaps are isolated. When a client remounts, the destination filer 204 is exported for the client, and the client can use the destination filer with file handles and metadata that is specific to the destination filer 204. Exchanges 251, 253 between the clients 201 and the destination are conducted with the destination filer being the new source.

Methodology

Figure 3:
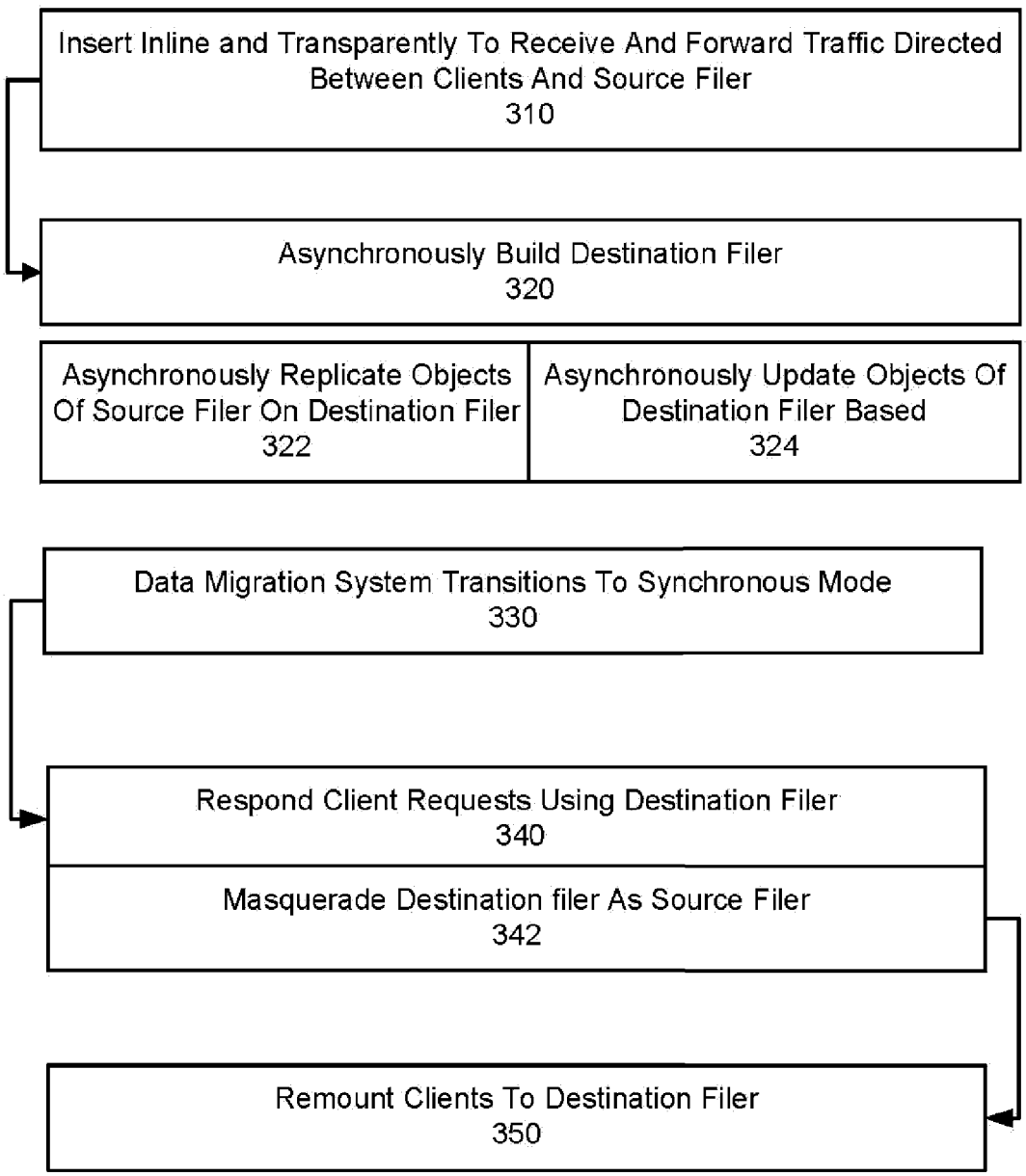
FIG. 3 illustrates a method for implementing a data migration system in stages to migrate a source file system without interruption of use to clients that use the source file system, according to an embodiment.
Figure 4:
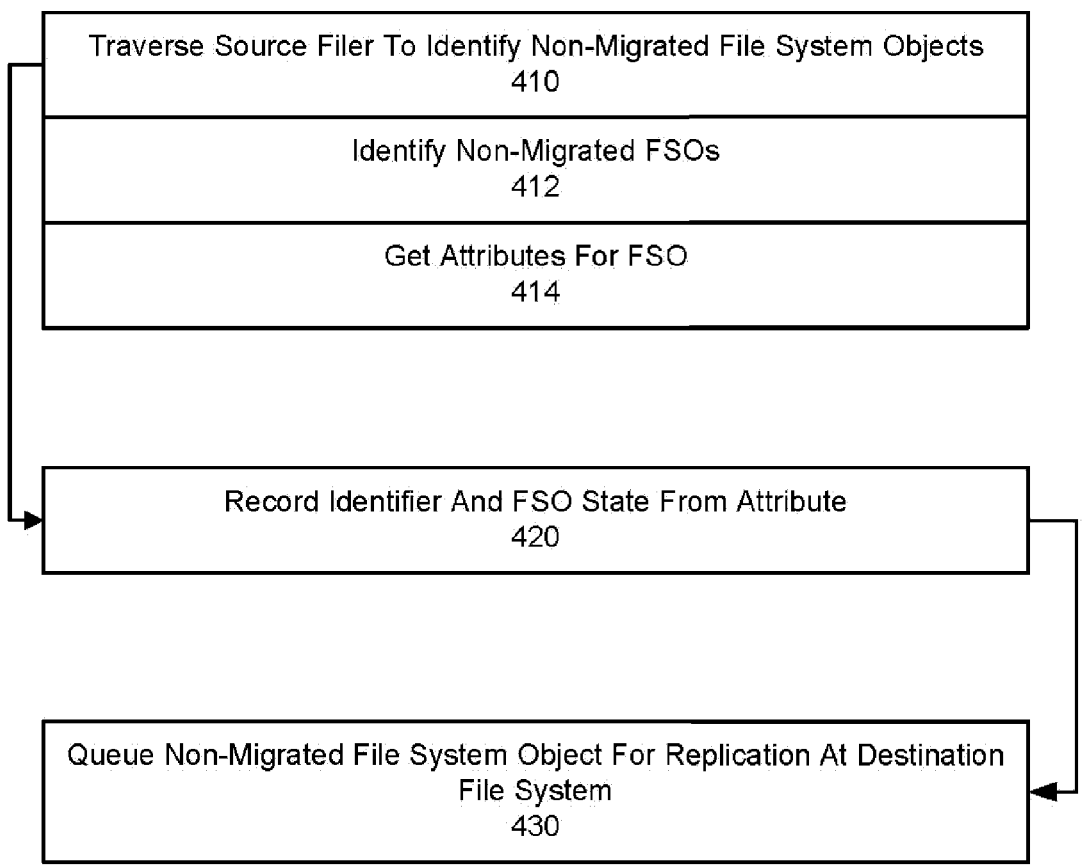
FIG. 4 illustrates a method for actively discovering and asynchronously replicating file system objects of a source file system while the source file system is in use, according to an embodiment.
Figure 5:
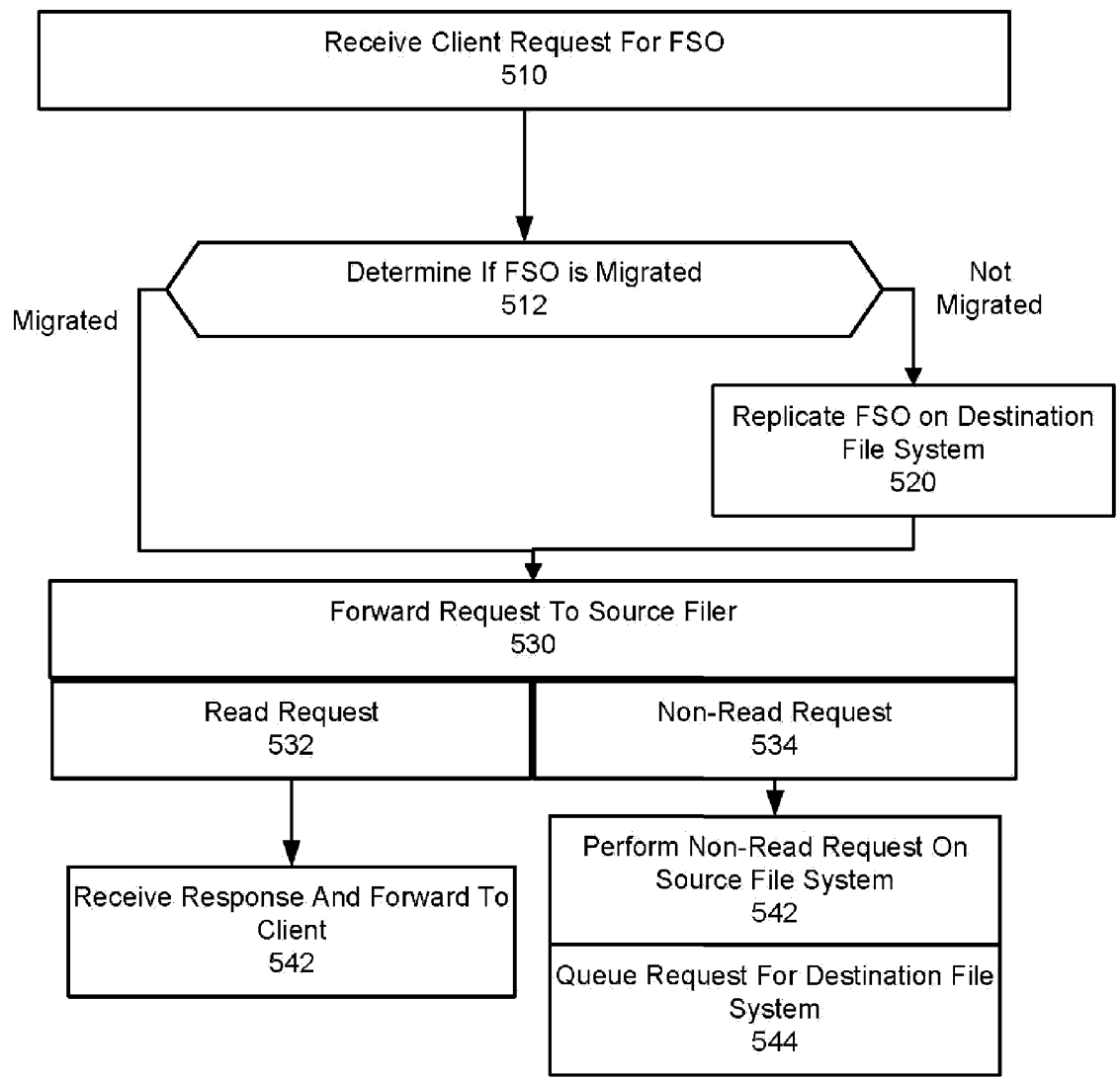
FIG. 5 illustrates a method for passively discovering and asynchronously replicating file system objects of a source file system while the source file system is in use, according to an embodiment.
Figure 6:
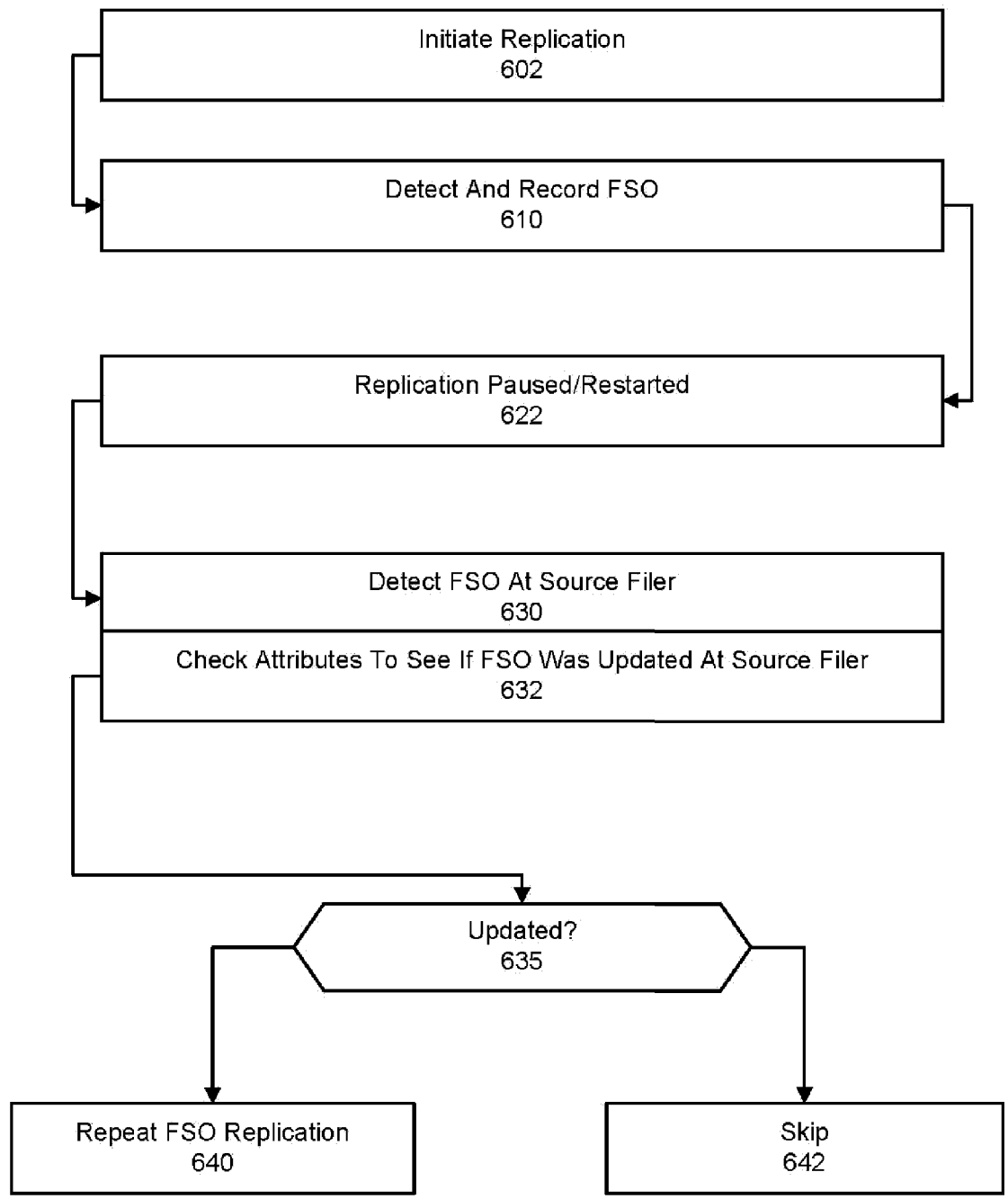
FIG. 6 illustrates a method for conducting a pause and restart in the data migration, according to an embodiment.
Figure 7:
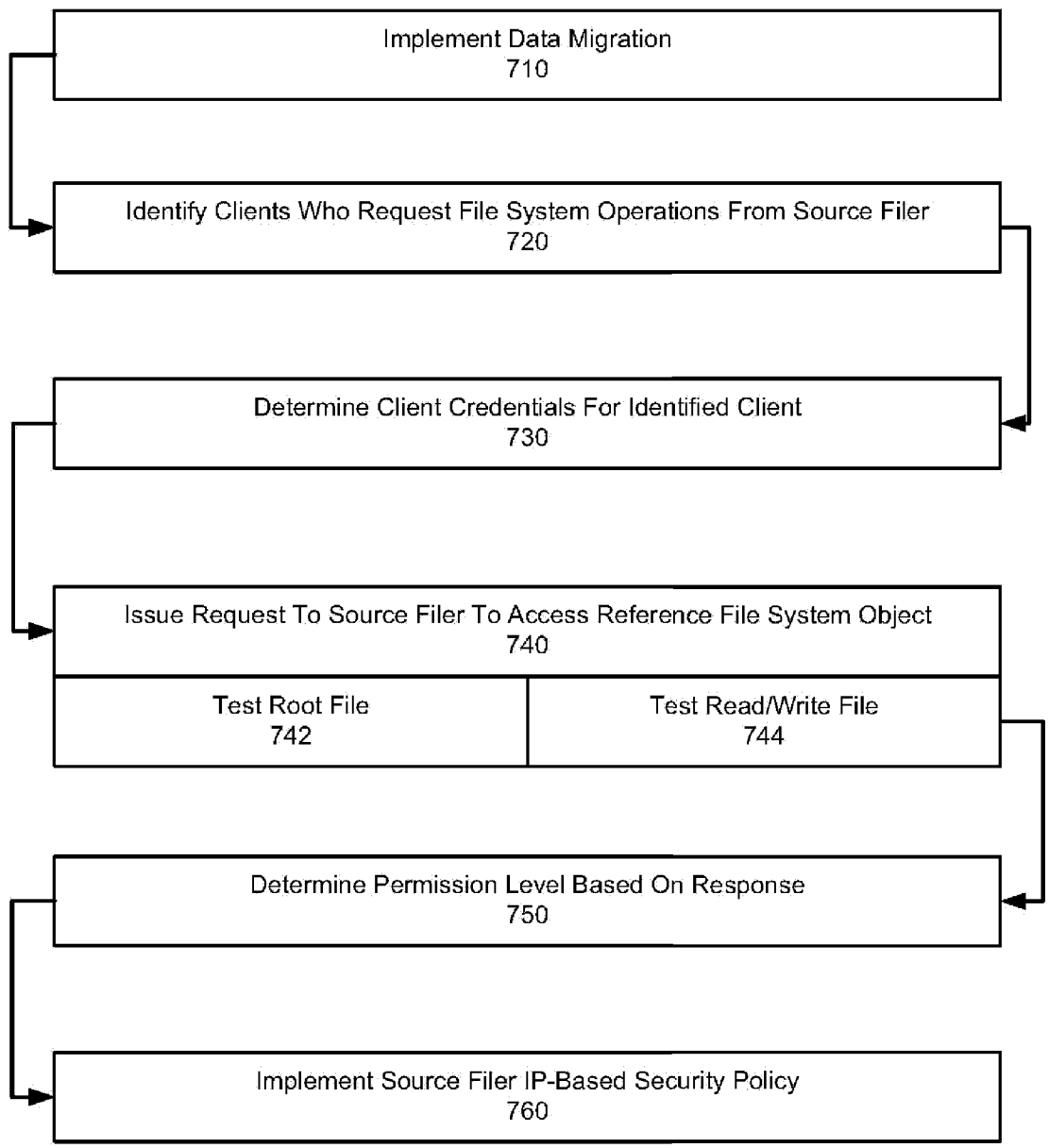
FIG. 7 illustrates an example method for implementing data migration while preserving IP-based security policies of the source file system, according to an embodiment.

FIG. 3 illustrates a method for implementing a data migration system in stages to migrate a source filer without interruption of use to clients that use the source filer, according to an embodiment. FIG. 4 illustrates a method for actively discovering and asynchronously replicating file system objects of a source file system while the source file system is in use, according to an embodiment. FIG. 5 illustrates a method for passively discovering and asynchronously replicating file system objects of a source file system while the source file system is in use, according to an embodiment. FIG. 6 illustrates a method for conducting a pause and restart in the data migration, according to an embodiment. FIG. 7 illustrates a method for migrating data from a source file system to a destination file system while manipulating select attributes in order to maintain continuity of use by clients of the source file system, according to one or more embodiments. Examples such as described with FIG. 3 through FIG. 7 can be implemented using, for example, a system such as described with FIG. 1. Accordingly, reference may be made to elements of FIG. 1 for purpose of illustrating suitable elements or components for performing a step or sub-step being described.

With reference to FIG. 3, a data migration system is inserted in-line in the network path of clients that utilize the source filer (310). The insertion of the data migrate system 100 can be transparent, so that the use of the source filer by the clients is not interrupted. In particular, the data migration system replicates data from the source filer into a destination filer without requiring the clients of the source file or to unmount from the source filer. In one implementation, the data migration system 100 obtains the IP addresses of the source filer. The TCP network connection between the clients and the source filer 102 can be disconnected. When the clients attempt to reconnect to the source filer, the data migration system intercepts the communications to the source filer (e.g., intercepts traffic with the IP address of the source filer 102), and then proxies communications between the clients and the source filer.

Once the data migration system 100 is operational to intercept and proxy traffic between the clients and source filer 102, the data migration system asynchronously populates the destination filer 104 (320). This can include asynchronously replicating objects detected on the source filer 102 at the destination filer 104 (322). In one implementation, the file system objects of the source filer 102 are queued for replication at the destination filer 104.

In addition to replication, the source filer 102 can receive client requests that specify file system operations that modify the source filer 102 or its contents. In the asynchronous stage, file system operations that modify previously replicated objects of the source filer 102 are asynchronously replayed at the destination filer 104 (324), where they update the corresponding file system objects.

According to some embodiments, the data migration system can transition from asynchronously updating the destination filer 104 to synchronously updating the destination filer 104 (330). Some embodiments provide for a threshold or trigger for transitioning from asynchronous replication and update to synchronous updating of the source filer 102. For example, the transition from asynchronous to synchronous mode can occur when the source and destination filer's 102, 104 are deemed to be equivalent, such as at a particular snapshot in time. When synchronously updating, any client request that modifies the source filer 102 is immediately replayed on the destination filer 104. Thus, for example, a replay request is issued to the destination filer 104 in response to a corresponding client request for the source filer 102. The replay request can be issued to the destination filer independent of the response from the source filer 102 to the client request. Thus, the file system objects of the source filer 102 and destination filer 104 are synchronously created or updated in response to the same client request.

At some point when the destination filer 104 is complete (or near complete), the data migration system 100 switches and provides responses from the destination filer 104, rather than the source filer 102 (340). The client can still issue requests to the source filer 102. Read-type operations which do not modify file system objects can be responded to from the destination filer 104, without forwarding the request to the source filer 102. Other non-read type operations that modify file system objects or the filer can be forwarded to the destination filer 104 for response to the client. At the same time, the source filer 102 can be synchronously updated based on the operation specified by the request. However, all of the requested client operations are serviced from the destination filer.

According to some embodiments, the data migration system 100 masquerades responses from the destination file 104 as originating from the source filer 102 (342). More specifically, the data migration system 100 alters metadata or other attributes (e.g., timing attributes such as m-time) to reflect metadata of the corresponding file system object residing on the source filer 102, rather than the destination filer 104. This enables the client 101 to seamlessly process the response from the destination filer 104.

At a subsequent time, the data migration of the source filer 102 may be deemed complete. The clients can be unmounted from the source filer 102, and remounted to the destination filer 104 (350). The unmounting and remounting of the clients can occur in a rolling fashion, such as one at a time. This allows an administrator to reconfigure the clients to use the destination filer 104 with minimal disruption.

With reference to FIG. 4, asynchronous replication of the source filer 102 can include active identification of file system objects, which are then replicated on the destination file 104 (410). In one example, the source filer 102 is traversed to identify non-migrated file system objects (412). A traversal algorithm can be deployed, for example, to scan the file system objects of the source filer 102. The traversal algorithm can be implemented by, for example, a client-type process (e.g., client process provided on server) that issues requests to the source filer 102 for purpose of scanning the source filer. The attributes for individual file system objects can used to determine whether the particular file system object had previously been migrated to the destination filer 104. If the data migration system 100 has not acquired the attributes for a file system object, then the object may be deemed as being non-migrated or newly discovered. Once identified, the attribute for each such file system object is retrieved (414).

From the attribute, the identifier for the file system object is determined and recorded (420). The identifier can uniquely identify the file system object. A record of the file system object and its attributes can be made and stored in, for example, a corresponding lookup store. Additionally, the attributes of the file system object can be used to determine a state of the particular file system object.

The identified file system object can then be queued for replication at the destination file system 104 (430). For example, the replication engine 124 can schedule replication of the file system object at the destination filer 104.

With reference to FIG. 5, asynchronous replication of the source filer 102 can also include passive identification of file system objects, where file system objects are identified for replication from client communications that send requests (e.g., NFS type requests) to the source filer 102. In implementation, the data migration system receives client request for file system objects that reside on the source filer 102 (510). A determination is made as to whether the file system object has previously been migrated to the destination filer (512). As described with an example of FIG. 1, the determination may be based on the identifier of the file system object, which can be based in part on the attributes of the object. For example, an OID key can be determined for the file system object and then used to determine whether the object was previously migrated to the destination filer 104.

If the determination is that the object has previously been migrated, the client request is forwarded to the source filer 102 for a response (530). If, however, the determination is that the object has not previous been migrated, a sequence of operations may be queued and asynchronously implemented in which the file system object is replicated on the destination file system 104 (520). The asynchronous replication of the file system object enables the client requests to readily be forwarded to the source filer for response (530). If the forwarded request is a read-type request (532), a response is received from the source filer for the read request and forwarded to the client (542). If the forwarded request is a non-read type request that modifies are alters the source filer or its objects (534), then (i) the response is received from the source filer (534) and forwarded to the client (542), and (ii) the request from the client is queued for replay on a corresponding replicated file system object of the destination filer 104 (544).

In FIG. 6, data migration system 100 can be initiated to migrate data from the source filer to the destination filer. As mentioned with various embodiments, file system objects of the source filer 102 can be detected (e.g., actively or passively), and attributes for the detected file system objects are recorded (610). Additionally, the attributes of file system objects can be recorded from responses provided by the source filer to client requests (620).

While the data migration system is taking place, the data migration system 100 and can be paused for a period of time, then restarted (622). For example, an administrator may pause the data migration system 100 prior to the completion of the asynchronous build stage. When paused, the source filer 102 remains in active use, and clients can modify the contents of the source filer by adding, deleting or modifying file system objects of the source filer. When the data migration system returns online, the data migration system does not know what changes took place while it was paused. Rather to initiate the whole process over, again, the data migration system 100 can reinitiate active and/or passive file system object detection.

When a file system object of the source filer's detected (630), the attributes of the file system object can be checked to determine whether that particular file system object represents a modification to the source filer that occurred during the pause (632). Specific attributes that can be checked include timing parameters, such as modification time (m-time). The OID node 131 (see FIG. 1) for a given file system object can also include its attributes as recorded at a given time. In the response to the client request (whether active or passive), the attributes of the file system object can be inspected and compared against the recorded values. A determination can be made as to whether the values of the file system object indicate that the file system object had been updated during the pause (635). If the determination indicates that the file system object was updated, then the particular file system object is replicated again on the destination filer 104 (640). For example, the file system object can be queued by the replication engine 124 for replication at a scheduled time. If the determination indicates that the file system object was not updated, then no further re-replication is performed (642).

FIG. 7 illustrates an example method for implementing data migration while preserving IP-based security policies of the source file system, according to an embodiment. An example method such as described with FIG. 7 can be implemented using components such as described with a system of FIG. 1. Accordingly, reference may be made to elements of FIG. 1 for purpose of illustrating suitable components for performing a step or sub-step being described.

With reference to FIG. 7, data migration may be implemented and in progress, so that data is transferred from the source filer 102 to the destination filer 104 while the clients 101 continue to issue requests from the source filer (710). A method such as described with FIG. 7 can be implemented during, for example, the cut-over stage, when data migration system 100 forwards client requests to the destination filer 104. At this stage, embodiments recognize that the destination filer 104 is unable to implement IP-based security policies that would otherwise be in force on the source filer 102 because the data migration system 100 is masking the true IP addresses of the client. Accordingly, data migration system 100 can discover and then implement the IP-based policies of the source file 102 in connection with the cutover stage, in which the destination filer 104 receives and performs the file system operations requested by the source 102. The discovery and implementation of the IP-based policies can further be performed without interrupting the normal process by which clients 101 utilize the source filer 102, so that the data migration system's involvement in migrating the data while implementing the policies remains seamless and transparent to the clients.

In implementing the IP-based policies, the data migration system 100 identifies clients that request file system operations from the source filer 102 (720). For example, the data migration system 100 can respond to requests from individual clients for file system objects and access.

From such requests, the data migration system 100 can identify the credentials of each client (730). For example, credentials provided in the client requests as provided by the Remote Procedure Call (RPC) protocol can be identified.

Once identified, the credentials can be used to issue a reference request to the source filer to access a reference file system object (740). In one embodiment, the data migration system 100 creates reference file system objects (e.g., test files) on the source filer 102. Each reference file system object can correspond to a resource that will not affect migration or requested contents of source filer 102 with respect to the client(s) that are issuing requests. As the source filer 102 may have multiple exports and a different set of security policies for each export, the data migration system 100 may create multiple sets of reference objects, with each set of objects being used to discover the security policies of a particular export.

Thus, according to some embodiments, the data migration system 100 can create multiple sets of test files for the different exports of the source filer 102. One implementation provides for creation of a test root file for each export of the source filer 102. Such a file can be created so as to designate a permission level corresponding to the root level—e.g., an administrator level user (742). In one implementation, the reference request can specify the RPC credentials of a particular client, as determined from a corresponding client request. Another implementation provides for the creation of a read/write file for each export, where the read/write file that has no read access restrictions (744).

The source filer's response to the request generated from the data migration system 100 for the reference files can identify the permission level associated with a particular set of credentials (750) for a particular export. For example, a given client credentials can be used to determine whether the client has root level permissions (from the root test file), or whether the client has general read-only access (from the read/write test file). In variations, other test files can determine other permission levels for credential sets. The permission levels determined in this matter can be specific to a particular export of the source filer.

Once determined, the data migration system 100 can implement security policies based on the credentials of the individual clients, on behalf of the destination filer 104 (760). For example, in a given export, the data migration system 100 denies those clients that have been identified as having read-only access with the ability to specify write-access operations. Likewise, the data migration system 100 may determine root-level access clients, and then deny non-root-level clients access to those file system objects which require root-level permission levels.

Additionally, if the client request identifies the client as a root user, but the determination is made that the user does not have root access on the particular export, the credentials in the request can be remapped to that of a pre-configured anonymous user. In such an implementation, the destination filer 104 can also be configured have a pre-determined response to the anonymous user. In one implementation, the access level of the pre-configured anonymous user can be set on the destination filer 104 by an administrator. For example, the pre-configured anonymous user can be set to have a lesser level of permission than the root level user.

Computer System

Figure 8:
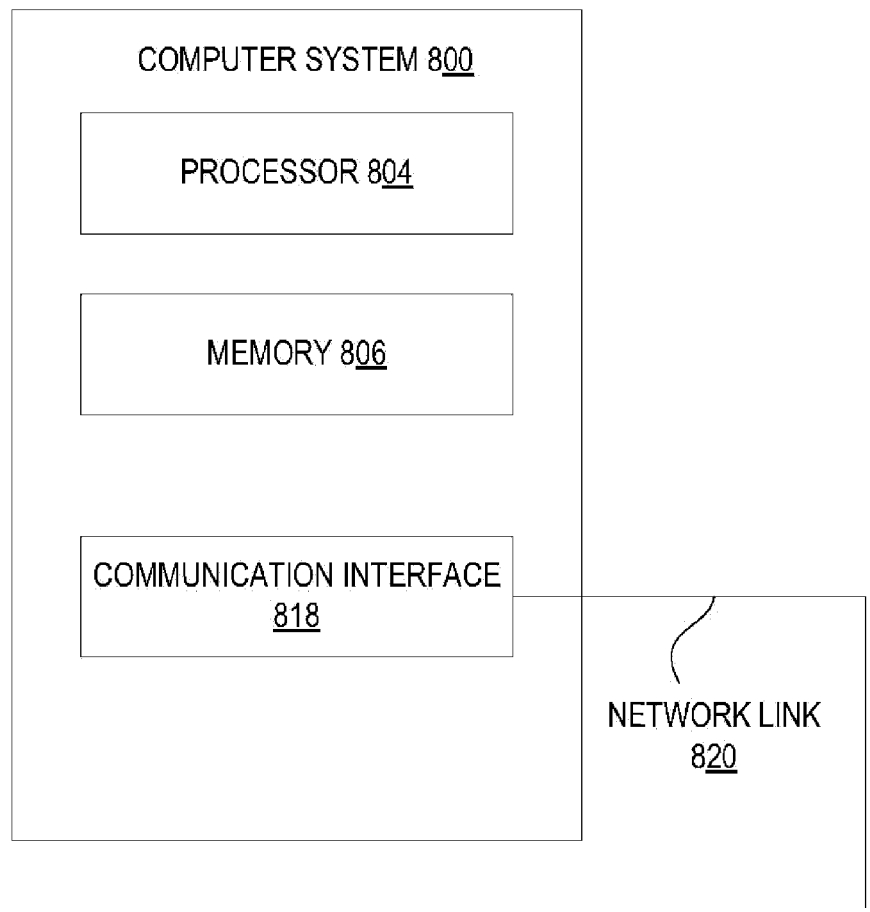
FIG. 8 is a block diagram that illustrates a computer system upon which embodiments described herein may be implemented.

FIG. 8 is a block diagram that illustrates a computer system upon which embodiments described herein may be implemented. For example, in the context of FIG. 1 and FIG. 2A through 2E, data migration system 100 (or 203) may be implemented using one or more computer systems such as described by FIG. 7. Still further, methods such as described with FIG. 3, FIG. 4, FIG. 5, FIG. 6 and FIG. 7 can be implemented using a computer such as described with an example of FIG. 8.

In an embodiment, computer system 800 includes processor 804, memory 806 (including non-transitory memory), storage device 810, and communication interface 818. Computer system 800 includes at least one processor 804 for processing information. Computer system 800 also includes a main memory 806, such as a random access memory (RAM) or other dynamic storage device, for storing information and instructions to be executed by processor 804. Main memory 806 also may be used for storing temporary variables or other intermediate information during execution of instructions to be executed by processor 804. Computer system 800 may also include a read only memory (ROM) or other static storage device for storing static information and instructions for processor 804. A storage device 810, such as a magnetic disk or optical disk, is provided for storing information and instructions. The communication interface 818 may enable the computer system 800 to communicate with one or more networks through use of the network link 820 (wireless or wireline).

In one implementation, memory 806 may store instructions for implementing functionality such as described with an example of FIG. 1, FIG. 2A through FIG. 2E, or implemented through an example method such as described with FIG. 3 through FIG. 7. Likewise, the processor 704 may execute the instructions in providing functionality as described with FIG. 1, FIG. 2A through FIG. 2E, or performing operations as described with an example method of FIG. 3, FIG. 4, FIG. 5, FIG. 6 or FIG. 7.

Embodiments described herein are related to the use of computer system 800 for implementing the techniques described herein. According to one embodiment, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for data migration, the method being implemented by one or more processors and comprising:
   implementing a data migration in which a data migration system migrates data from a source file system to a destination file system;
   intercepting, at the data migration system, a file system operation request for one or more file system objects on a volume of the source file system from a client while the data migration is in progress;
   determining a set of credentials for the client from the intercepted file system operation request;
   creating one or more reference file system objects on the volume of the source file system corresponding to the file system operation request, wherein each of the one or more reference file system objects are assigned a separate permission level and do not affect the data migration;
   issuing a test request from the data migration system to the source file system to access, using the client's set of credentials, the one or more reference file system objects on the volume of the source file system;
   determining permission levels associated with the volume for the client based on a response received from the source file system to the test request to access the one or more reference file system objects on the volume of the source file system; and
   based on the determined permission levels, implementing a security policy at the data migration system, on behalf of the destination file system, for file system operation requests intercepted from the client at the data migration system that are intended for the volume.

2. The method of claim 1, further comprising creating a test file as one of the reference file system objects.

3. The method of claim 2, wherein the test file corresponds to a root access level file system object.

4. The method of claim 2, wherein the test file corresponds to an unrestricted file system object used to determine read-only access.

5. The method of claim 1, wherein determining the set of credentials includes determining a set of Remote Procedure Call (RPC) credentials for each client.

6. The method of claim 5, wherein issuing the test request using the client's set of credentials includes issuing the test request using the identified RPC credentials.

7. The method of claim 1, wherein implementing the security policy includes implementing an Internet-Protocol (IP) based security policy.

8. A data migration system comprising:
   a memory that stores a set of instructions;
   one or more processors that use the instructions to:
   migrate data from a source file system to a destination file system;
   intercept a file system operation request for one or more file system objects on a volume of the source file system from a client during data migration;
   determine a set of credentials for the client from the intercepted file system operation request;
   create one or more reference file system objects on the volume of the source file system corresponding to the file system operation request, wherein each of the one or more reference file system objects are assigned a separate permission level and do not affect the data migration;
   issue a test request from the data migration system to the source file system to access, using the client's set of credentials, the one or more reference file system objects on the volume of the source file system;
   determine permission levels associated with the volume for the client based on a response received from the source file system to the test request to access the one or more reference file system objects on the volume of the source file system; and
   based on the determined permission levels, implement a security policy at the data migration system, on behalf of the destination file system, for file system operation requests intercepted from the client at the data migration system that are intended for the volume.

9. The data migration system of claim 8, wherein the one or more processors create a test file as one of the reference file system objects.

10. The data migration system of claim 9, wherein the test file corresponds to a root access level file system object.

11. The data migration system of claim 9, wherein the test file corresponds to an unrestricted file system object used to determine read-only access.

12. The data migration system of claim 8, wherein the one or more processors determine the set of credentials by determining a set of Remote Procedure Call (RPC) credentials for each client.

13. The data migration system of claim 12, wherein the one or more processors issue the test request using the client's set of credentials by issuing the test request using the identified RPC credentials.

14. The data migration system of claim 8, wherein the one or more processors implement the security policy by implementing an Internet-Protocol (IP) based security policy.

15. A non-transitory computer-readable medium that stores instructions, executable by one or more processors, to cause the one or more processors to perform operations that comprise:

implementing a data migration in which a data migration system migrates data from a source file system to a destination file system;

intercepting, at the data migration system, a file system operation request for one or more file system objects on a volume of the source file system from a client while the data migration is in progress;

determining a set of credentials for the client from the intercepted file system operation request;

creating one or more reference file system objects on the volume of the source file system corresponding to the file system operation request, wherein each of the one or more reference file system objects are assigned a separate permission level and do not affect the data migration;

issuing a test request from the data migration system to the source file system to access, using the client's set of credentials, the one or more reference file system objects on the volume of the source file system;

determining permission levels associated with the volume for the client based on a response received from the source file system to the test request to access the one or more reference file system objects on the volume of the source file system; and based on the determined permission levels, implementing a security policy at the data migration system, on behalf of the destination file system, for file system operation requests intercepted from the client at the data migration system that are intended for the volume.

16. The computer-readable medium of claim 15, further comprising instructions for creating a test file as one of the reference file system objects.

17. The computer-readable medium of claim 16, wherein the test file corresponds to a root access level file system object.

18. The computer-readable medium of claim 16, wherein the test file corresponds to an unrestricted read-only access file system object.

19. The method of claim 1, wherein receiving the file system operation request occurs during a cutover phase of data migration.

20. The data migration system of claim 8, wherein the data migration system receives the file system operation request during a cutover phase of data migration.

\* \* \* \* \*